Dec. 1, 1953   R. V. GAUMER   2,660,748
WINDSHIELD WIPER TENSIONING ATTACHMENT
Filed July 11, 1951
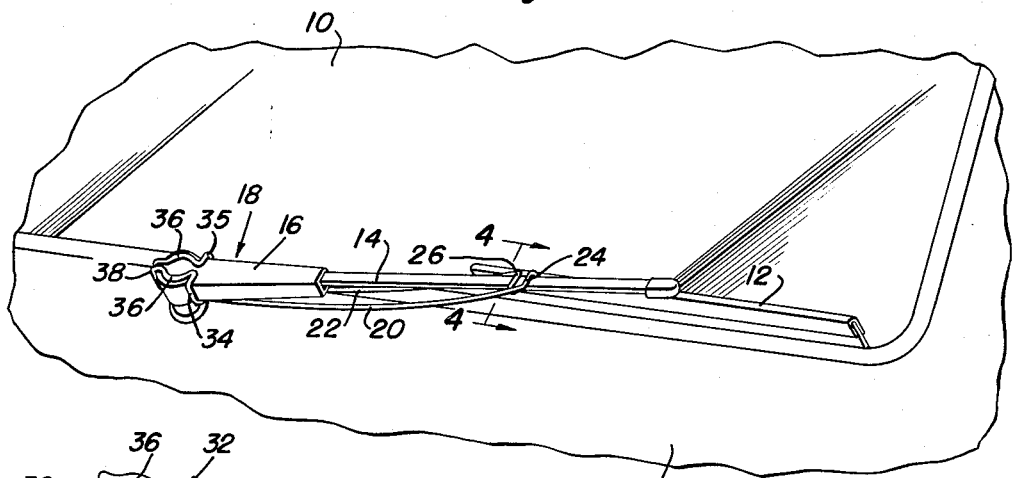
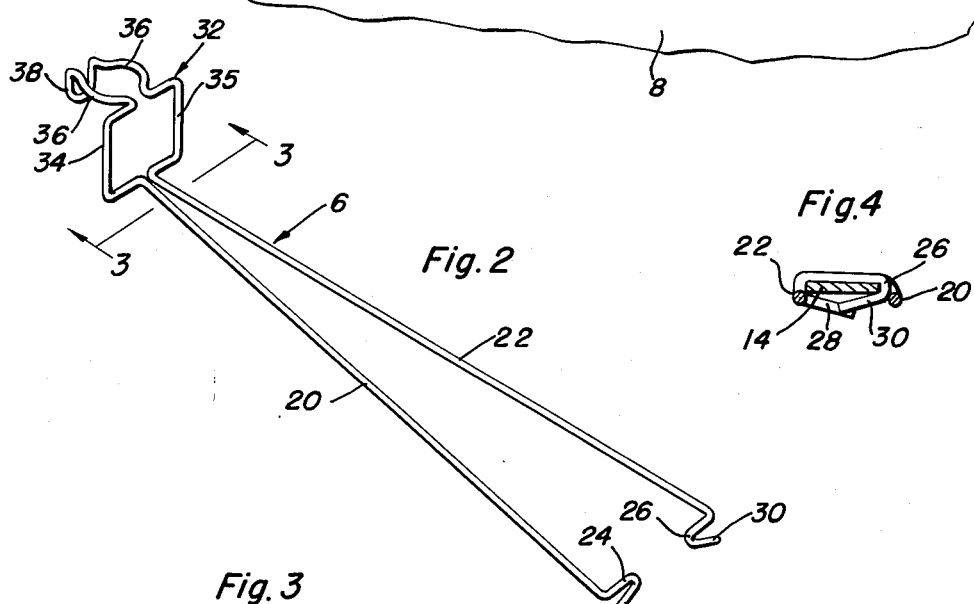
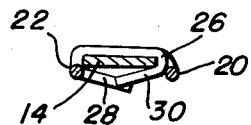
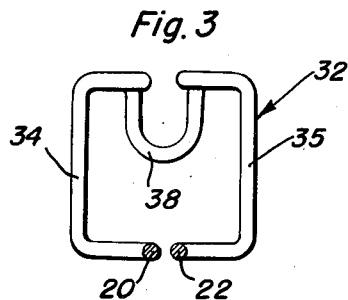
Rolland V. Gaumer
INVENTOR.

Patented Dec. 1, 1953

2,660,748

UNITED STATES PATENT OFFICE 2,660,748

WINDSHIELD WIPER TENSIONING ATTACHMENT

Rolland V. Gaumer, Zanesville, Ohio, assignor to Industrial Devices of America, Inc., Zanesville, Ohio, a corporation of Ohio Application July 11, 1951, Serial No. 236,213

3 Claims. (Cl. 15—255)

The present invention relates to certain new and usful improvements in automotive accessories and appliances and has more particular reference to a novelly constructed attachment for a windshield wiper, an attachment which appreciably contributes to the proper functioning of the wiper by subjecting the blade thereof to a degree of pressure which it does not ordinarily have.

A typical windshield wiper would be the type currently used on every day automobiles and characterized by a yieldable wiper arm, a squeegee or so-called wiper blade detachably carried by the outer end of the arm, the opposite end of the arm, the opposite end of said arm fitting removably into a hollow oscillatory member sometimes referred to as a "rocker head." Under ordinary circumstances, currently constructed wipers are adequate. When, however, snow begins to accumulate on the surface of the windshield or where the wiper has to cope with accumulating sleet and mud thrown by passing cars, the scraping and wiping pressure of the blade is insufficient. Since clear vision, whenever possible is essential for reliable and safe driving, various styles and forms of extra tensioning devices have been put forth for use. The instant invention likewise has to do with a pressure intensifying attachment which exerts the forces of added tension when properly annexed to the wiper carrying arm, which applies the extra force at focal point where it is most needed and whic his adapted to promote superior wiping and cleansing results.

Another object of the invention is to structurally, functionally, and otherwise improve upon prior art wiper arm tensioning devices through the provision of one which performs with requisite efficiency by reason of its special construction and the particular mode of attachment, which is of great practical value, is simple, economical and constitutes a unique over-all attachment in which manufacturers and users will find their general needs and requirements fully met and available.

Briefly stated, the invention has to do with a windshield, a powered rocker head mounted for operation adjacent to said windshield, a resilient wiper arm secured at one end to said head and having its opposite end adapted to sweep back and forth in an arcuate path across said windshield, a wiper carried by the last-named end of said arm and having contact with said windshield, and a pair of added tension exerting fingers interposed between said windshield, head an arm an having means at corresponding ends connected to a portion of said arm in close proximity to said wiper and having other means at their opposite remaining ends anchored on said head.

More specifically, it is another object of the invention to utilize an attachment which is susceptible of construction from a single length of resilient wire of appropriate gauge which is bent intermediate its ends to define a pair of resilient limbs or fingers having hook means at corresponding ends for retentive connection with the windshield wiper arm and having novel spring actuated clamp means at their oppoiste ends to embrace the hollow rocker head and to, in this manner, retain the fingers between the wiper arm and windshield so that they may be flexed and thus bowed in such a way as to impose the desired added tensioning pressure on the wiper blade.

Other objects and advantages will become more readily apparent from the following description and the accompanying sheet of illustrative drawings.

In the accompanying sheet of drawings wherein like numerals are employed to designate like parts throughout the views:

Figure 1 is a fragmentary view showing a portion of an automobile body and windshield, showing a conventional windshield wiper and showing, more importantly, the tensioning attachment and the manner in which it is applied and used;

Figure 2 is a perspective view of the attachment by itself;

Figure 3 is an enlarged section taken on the plane of the line 3—3 of Figure 2, looking in the direction of the arrows; and Figure 4 is a cross-section on an enlarged scale taken on the line 4—4 of Figure 1, looking in the direction of the arrows.

Referring now to the drawings with the aid of reference numerals and accompanying lead lines, the attachment, as an entity is denoted by the numeral 6 in Figure 2. In Figure 1, numeral 8 designates a portion of an automobile body and 10 denotes a windshield with which it is provided. The squeegee or wiper blade is denoted by the numeral 12 and this is carried by the usual resilient carrying arm 14 fitting operatively and held in the hollow tubular portion 16 of the oscillatory rocker head 18.

As before mentioned, the complete attachment 6 is characterized by resilient bowable limbs with hook means at corresponding ends to releasably engage the carrying arm 14 and resilient clamping means at their opposite ends for application to and retention on the rocker head 18. Specifically this result is attained by utilizing a single length of wire which is, of course, of appropriate gauge and resilient properties. The wire is bent between its ends to define the essential features. Primarily, the free end portions of the bent wire provide a pair of opposed duplicate limbs or fingers 20 and 22. The free ends of the fingers are bent laterally toward each other to define hooks 24 and 26 whose respective beak or bill portions are bent laterally outward in opposite directions as at 28 and 30. The fingers are normally spread apart when they are in the divergent relationship shown in Figure 2 wherein the attachment is shown by itself. This tendency to urge the fingers apart by the inherent resilient properties is advantageous when the fingers are applied and it helps to flex and bow the fingers to add to their expected tensioning functions. At the converging ends the fingers are fashioned into a substantially rectangular two-part clamp which is denoted, as a unit, by the numeral 32. The clamp is actually made up of a pair of companion U-shaped members 34 and 35. These members are joined by spring means embodying suitably curved bends 36—36 joined by a depending U-shaped bight portion 38 constituting a detent. The clamp is at right angles to the fingers and the spring means at right angles to the clamp and parallel with the fingers and the spring means lends itself to proper cooperation with the associated portion of the aforementioned rocker head 18. In applying the device the U-shaped members 34 and 35 are spread apart so that the clamp encircles the tubular member 16 and so that the limbs underlie said member as well as the carrying arm 15. This applies the spring means 36—36 in the position shown and installs the detent 38 so that it engages the coacting portion of the head and, in conjunction with the clamp, properly and effectively applies or installs the complete attachment. In order to achieve the desired tensioning results, the limbs 20 and 22 are bowed or flexed as shown so that they occupy positions between the windshield and the carrying arm 14. The hook means 26 and 30 on the finger 22 is engaged over the arm 14 and the other hook means 24 and 28 is engaged in an opposite direction over the same arm. This draws the two fingers together and puts them under tension and also bows the fingers so as to apply the desired extra pressure forces at the place desired, preferably at the juncture of the carrying arm and wiper blade. The device thus applied has shown during actual use, that the increased tension was sufficient to remove snow readily as well as sleet and mud, leaving a clean, clear windshield. It has been noted that when in use the attachment actually increases the length of service of the wiper blade. The attachment is of great simplicity and economical, easy to apply and remove and requires no tools and when in use, tends to prevent rattling of the windshield wiper assembly.

It is thought that persons skilled in the art to which the invention relates will be able to obtain a clear understanding of the invention after considering the description in connection with the drawings. Therefore, a more lengthy description is regarded as unnecessary.

Minor changes in the shape, size, materials and arrangement of parts may be resorted to in actual practice without departing from the spirit and scope of the invention, as claimed.

Having described the invention, what is claimed as new is:

1. For annexation to a windshield wiper arm and coacting assembly, a tensioning attachment comprising a pair of duplicate normally spaced diverging resilient limbs terminating at corresponding tension exerting ends in oppositely directed attaching and retaining hooks, the opposite converging ends of said limbs having right angularly disposed two-part clamp means, said clamp means being provided with lateral spring means and said spring means having a lateral detent in spaced parallelism relative to said clamp means.

2. For use in conjunction with a windshield, a powered rocker head mounted for operation adjacent to said windshield, a resilient wiper arm secured at one end to said head and having its opposite end adapted to sweep back and forth in an arcuate path across said windshield, and a wiper carried by said last-named end of said arm and contactable with the stated windshield, a readily applicable and removable extra tensioning attachment for said head and arm comprising a pair of tension-exerting fingers adapted to be interposed between the windshield, head and arm and having means at corresponding free outer ends adapted to be releasably joined with a coacting portion of said arm, the opposite ends of said fingers having substantially rectangular frame means adapted to embrace said head, said frame means being at right angles to the fingers and the fingers being substantially coplanar to each other, and said frame means having an integral lateral detent adapted to cooperate with a portion of said head.

3. The structure specified in claim 2 wherein said attachment is formed from a single length of resilient wire bent intermediate its ends to simultaneously define the fingers, frame means and detent, said detent being angularly disposed in respect to the frame means.

ROLLAND V. GAUMER.

References Cited in the file of this patent

UNITED STATES PATENTS

| Number | Name | Date |
| --- | --- | --- |
| Re. 19,113 | Oishei | Mar. 13, 1934 |
| 1,451,698 | Kelber | Apr. 17, 1923 |
| 1,489,366 | Slay | Apr. 8, 1924 |
| 1,888,665 | Herlbauer | Nov. 22, 1932 |

FOREIGN PATENTS

| Number | Country | Date |
| --- | --- | --- |
| 546,431 | Great Britain | July 14, 1942 |